(12) United States Patent
Smith, III

(10) Patent No.: US 6,357,158 B1
(45) Date of Patent: Mar. 19, 2002

(54) RETICLE-EQUIPPED TELESCOPIC GUNSIGHT AND AIMING SYSTEM

(76) Inventor: Thomas D. Smith, III, 7008 Landing Rd., Oklahoma City, OK (US) 73132

( * ) Notice: Subject to any disclaimer, the term of this patent is extended or adjusted under 35 U.S.C. 154(b) by 0 days.

(21) Appl. No.: 09/152,320

(22) Filed: Sep. 14, 1998

(51) Int. Cl.$^7$ .................................................. F41G 1/38
(52) U.S. Cl. .......................................... 42/122; 42/130
(58) Field of Search .............................. 33/245; 42/122, 42/130

(56) References Cited

U.S. PATENT DOCUMENTS

| | | | |
|---|---|---|---|
| 1,190,121 A | | 7/1916 | Critchett |
| 3,190,003 A | | 6/1965 | O'Brien ........................ 33/50 |
| 3,392,450 A | | 7/1968 | Herter et al. ................. 33/50 |
| 3,431,652 A | | 3/1969 | Leatherwood ................ 33/50 |
| 3,492,733 A | | 2/1970 | Leatherwood ................ 33/50 |
| 3,737,232 A | * | 6/1973 | Milburn, Jr. ................ 356/18 |
| 3,948,587 A | | 4/1976 | Rubbert ...................... 356/21 |
| 4,285,137 A | * | 8/1981 | Jennie ........................ 33/246 |
| 4,403,421 A | | 9/1983 | Shepherd ..................... 33/246 |
| 4,561,204 A | * | 12/1985 | Binion ........................ 42/1 |
| 4,787,739 A | * | 11/1988 | Gregory ...................... 356/4 |
| 5,181,323 A | * | 1/1993 | Cooper ....................... 33/245 |
| 5,189,560 A | * | 2/1993 | Edwards et al. ............. 359/744 |
| 5,920,995 A | * | 7/1999 | Sammut ...................... 33/245 |

\* cited by examiner

*Primary Examiner*—Michael J Carone
*Assistant Examiner*—Denise J Buckley
(74) *Attorney, Agent, or Firm*—Ralph F. Crandell

(57) ABSTRACT

A gunsight reticle having a system of critically dimensioned and positioned target spanning indicia improves the aiming of a rifle. The indicia include orthogonally intersecting center vertical and center horizontal hairlines, and four horizontal range-marker lines of sequentially incremental length disposed below the horizontal hairline in bisected relationship with the center vertical hairline. The effectiveness of the gunsight is enhanced by a shooter's training program, interactive with the gunsight, which emphasizes the thought processes involving the planning, aiming and execution of a shot.

10 Claims, 4 Drawing Sheets

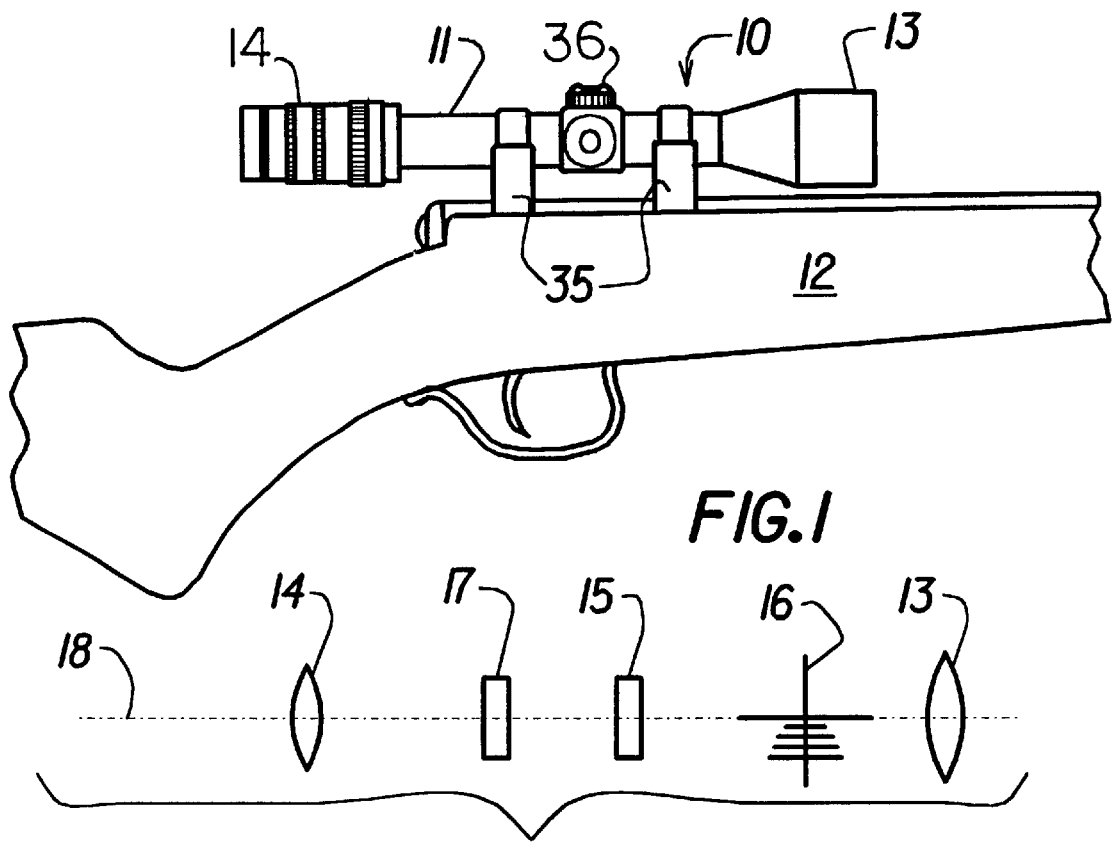
FIG.1
FIG.2
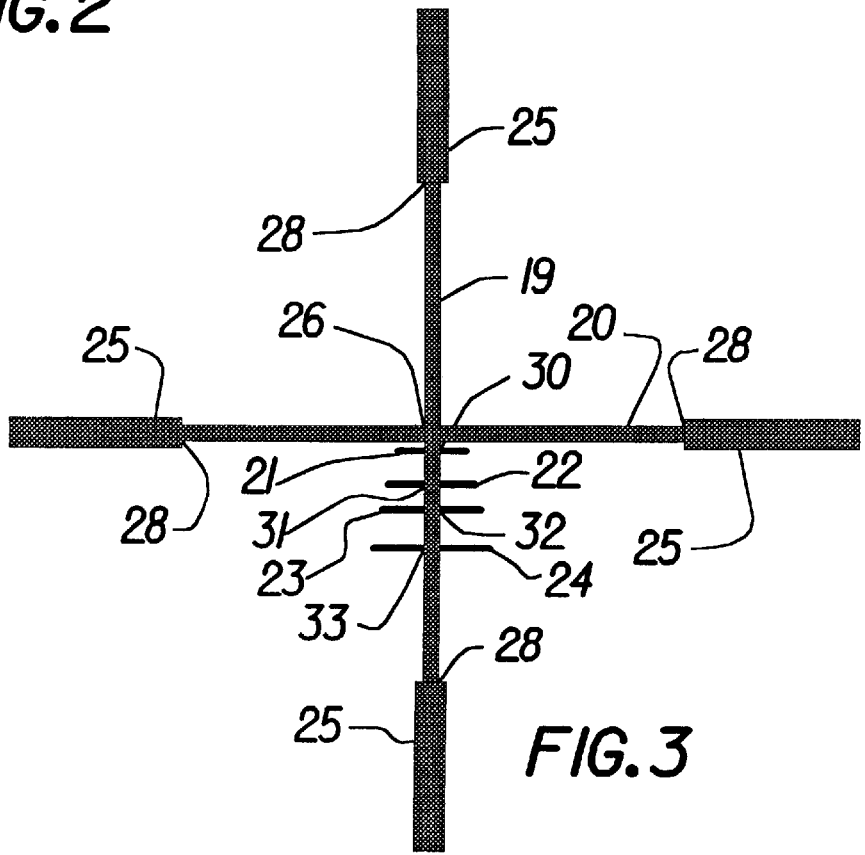
FIG.3

RETICLE-EQUIPPED TELESCOPIC GUNSIGHT AND AIMING SYSTEM

BACKGROUND OF THE INVENTION

1. Field of the Invention

This invention relates to telescopic rifle sights equipped with a transparent reticle designed by the TDS Mental Ballistics Systems, having a plurality of target spanning indicia which provide the rifle person an accurate first shot one-shot kill aiming method for running animal and stationary targets. The indicia allow the rifle person firstly:

A precise method for measuring distance to any size target, and then the same indicia switch function and Provide precise drop compensation aiming points for a point blank zone of two inches for approximately 400 yards beyond any high velocity bullet's normal point blank range plus thirdly, an accurate Lead Point for running animals and further concerns a method for aiming with said sight.

2. Description of the Prior Art

Whereas the line of sight between a shooter's eye and a target, whether using "iron" sights or a telescopic sight, is a straight line, the trajectory of the rifle bullet is not a straight line, particularly at long distances of bullet flight. Accordingly, it is necessary to know the distance to the target in order to achieve an accurate shot. Once the target distance is known, the rifle can be properly aimed by using the TDS TRI-FACTOR Mental Ballistics System which provides the rifle person the trajectory of any high velocity bullet fired from any rifle without having to rely upon the INGALLS' tables. When properly aimed, the line of sight will intersect the trajectory path exactly at the target distance.

Telescopic gun sights, often referred to as "scopes," generally contain a transparent flat reticle positioned orthogonally to the line of sight through the scope. The reticle has a single vertical hairline for indicating windage alignment relative to the target and a center horizontal hairline which intersects. said vertical hairline at the center of the reticle, said site of intersection or "cross hair" constituting the primary sighting point for the telescope, representing the site of bullet impact at a chosen distance. The reticle is moveable in vertical and horizontal directions by way of calibrated adjustment screws on the exterior of the scope. By firing a series of shots while making compensatory adjustments of the position of the reticle, the shooting system comprised of the bullet type, scope and shooter are "zeroed in," a condition wherein the site of bullet impact coincides with the position of the crossed hairlines. It is commonplace for reticles to have a series of secondary horizontal hairlines that intersect the vertical hairline below said center horizontal hairline. The sites of intersection of said secondary hairlines with the vertical hairline designate the bullet impact point at distances progressively further from the distance at which the center cross hair was "zeroed in." However, in order to utilize the secondary cross hairs with accurate results, the shooter must know the exact distance of the target.

Various types of range finder systems have earlier been disclosed for telescopic gunsights. For example, U.S. Pat. No. 1,190,121 to Critchett discloses a reticle having a series of target-spanning rulings disposed above a baseline, said rulings corresponding to associated shooting distances. In use, the shooter ascertains which ruling above the baseline makes the most closely embracing fit on the target, thereby determining the shooting distance. A separate cross hair aiming point is included in the reticle for use in association with each chosen ruling above the baseline.

The principle of the Critchett target-spanning rulings is that certain targets are of known, or at least estimable size. For instance, it is a fairly accurate estimate that in deer or antelope, the distance between the top of the back at the shoulders and the bottom of the chest cavity is about 18 inches. The target-spanning rulings are spaced apart such as to span a known target size at a known range. This manner of distance measurement is consistent with conventional trigonometric considerations wherein the triangle defined by the height of the target and the viewing angle of the telescope's optical system can be considered a right triangle, which accordingly establishes the length of either of the two sides of the triangle, namely the distance to the target.

U.S. Pat. No. 3,392,450 to Herter et. al. discloses a reticle having a series of target-spanning circles of different diameters which correspond to associated shooting distances. Employing the same basic distance-measuring concept as Critchett, the shooter employs for aiming that cross hair corresponding to the selected circle.

U.S. Pat. No. 3,190,003 to O'Brien concerns a range-finding reticle for a telescopic gunsight having single centered vertical and horizontal hairlines. The portion of the vertical hairline below the horizontal centerline is provided with widened bar regions extending various lengths below the centerline. Each bar subtends a target of known size. By finding which widened region corresponds to the height of the target, the shooting distance is determined.

U.S. Pat. No. 3,431,652 to Leatherwood discloses a telescopic gunsight wherein the distance to the target is determined by movement of upper and lower horizontal hairlines along a fixed vertical hairline in a manner so as to bracket the target. Once. bracketed, the intersection of the lower horizontal hairline with the vertical hairline serves as the cross hair aiming point. In this aiming process, the alignment of the scope changes with respect to the gun barrel, whereby the allowance for distance is achieved when the centered cross hair is sighted directly on the target.

U.S. Pat. No. 3,492,733 to Leatherwood discloses a distance-measuring system for a variable power telescopic sight which is pivotally moveable in a vertical plane with respect to the gun barrel upon which it is mounted. Cams within the scope and rotatable by external means achieve vertical movement of the scope so that horizontal framing hairlines will fit the target. A specialized cam must be installed into the scope for each particular ammunition employed.

U.S. Pat. No. 3,948,587 to Rubbert concerns a variable power telescopic sight having a reticle provided with a vertical hairline, a center horizontal hairline and three horizontal framing lines disposed below said center horizontal hairline. Aiming is achieved by positioning either the center cross hair or lower cross hairs on the target, as dictated by the observed fit of the target within said framing lines.

U.S. Pat. No. 4,403,421 to Shepherd discloses a telescopic gunsight having spaced apart primary and secondary reticles which are moveable relative to each other. The secondary reticle is also moveable vertically and horizontally within the plane of the reticle. The moveable two reticle system facilitates adjustments for windage and elevation. Distance to the target is ascertained by framing indicia on said secondary reticle.

The telescopic sights disclosed in the aforementioned Patents and elsewhere are often of limited usefulness insofar as they do not address the several factors that need be considered in the accurate aiming of a rifle, such factors including: distance to target, gravity drop of the bullet, hold over or hold under points, and wind drift correction, which includes the Yaw of Repose, which most shooters understand as "Magnus" effect. Said Magnus effect concerns the elevational effects of cross wind, and up hill or down hill correction. Earlier scopes may also require that the shooter look away from the target in order to make compensating adjustments. Some of the scopes may be difficult or slow to use, and some require moveable mounting on the rifle, a situation which subjects the scope to inaccuracy after repeated use, or abuse in rugged field conditions.

It is accordingly an object of the present invention to provide a telescopic sight (scope) which enables the shooter to quickly and accurately aim a rifle.

It is another object of this invention to provide a scope as in the foregoing object which may be securely affixed to a rifle.

It is a further object of the present invention to provide a scope of the aforesaid nature which enables the shooter to accurately aim and fire without having to look away from the scope.

It is yet another object of this invention to provide a scope of the aforesaid nature that enables the shooter to define an accurate aiming point in the scope which takes into account distance to the target and other factors that affect shooting accuracy.

It is yet another object of this invention to provide a scope of the aforesaid nature that enables the shooter to define an accurate aiming point in the scope which takes into account distance to the target and speed of the running animal to effect an accurate one-shot kill on a running animal.

It is a still further object of this invention to provide a scope of the aforesaid nature that enables an ethical hunter to eliminate those shots which result in wounded animals. This includes, but is not limited to those shot conditions where the bullet's flight path is no longer predictable, or its killing power is below that which guarantees a proper one-shot kill, or the Magnus crosswind effect may cause the bullet to lower into the gut of the animal. It is yet another object of this invention to provide a scope of the aforesaid nature that enables either a military or police counter-sniper two man team to deliver deadly and instantaneous counter battery fire upon a sniper to ranges in excess of 500 yards, using dissimilar caliber rifles, such as would be the case in a third world country.

It is yet another object of this invention to provide a scope of the aforesaid nature which subconsciously programs the mind of the shooter for either a running or stationary shot by presenting a reticle which is appropriate for either type shot.

It is an additional object of the present invention to provide a scope of the aforesaid nature that provides accurate fast aiming at moving targets.

It is a still further object of this invention to provide a scope of the aforesaid nature of durable and simple construction amenable to low cost manufacture.

These objects and other objects and advantages of the invention will be apparent from the following description.

SUMMARY OF THE INVENTION

The above and other beneficial objects and advantages are accomplished in accordance with the present invention by an improvement in a telescopic sight for targets of known or estimatable heights in combination with a firearm capable of propelling a bullet along a substantially predeterminable trajectory, said sight having an optical system comprised of a forward objective lens element, a rear eyepiece lens element and intervening erector lens element, said elements being protectively confined within an elongated tubular housing adapted to be affixed to said firearm. The improvement provided by the present invention comprises the addition into said optical system within said housing of a transparent reticle having indicia which provides accurately both the functions of distance measuring and aiming. The reticle is positioned between said objective lens element and said erector lens element. Said indicia comprises orthogonally intersecting center vertical and horizontal hairlines, and four horizontal wind bar lines disposed below said center horizontal hairline in vertically bisected relationship with said center vertical hairline.

The precise configuration and positioning of said wind bar lines is prescribed by "TDS TRI-FACTOR Mental Ballistics System"which is interactive with the bullet's Energy Maneuverability Curve. It allows the shooter a mental program that is accurate within 1.5 inches of a computer, quicker than a computer, easy to run, and works in a field environment without reliance on voluminous tables such as the Ingalls' table or batteries, electricity, a computer, or the oftentimes not provided bullet's Ballistics Coefficient. It computes and corrects bullet drop, drift, Magnus and up hill down hill angle shots with a few seconds. Its accuracy promotes confidence which in turn makes the shooter much more proficient.

The TDS TRI-FACTOR System requires the reticle bars to be capable of both accurate measurement, within (3% of a laser value) of any size animal and to then provide accurate drop compensation for any high velocity bullet. This chameleon-like requirement could only be accomplished by discovering the high velocity bullet's root source, its Energy Maneuverability Curve or EMC. The Energy Maneuverability Curve provided the mental formulas which are easier, quicker and faster to use than a computer. It provides accurate aiming guidance 250 to 400 yards past the bullet's Point Blank Range. The reticle accomplishes this by integrating each category of bullet into its five cross hairs, i.e., a .458 Winchester will receive aiming guidance to 350 yards, a .308 to 450, 30/06 to 500 yards, a 7 mm. Remington Magnum to 600 yards, a .300 Weatherby Magnum to 700 yards, and a 30/378 to 800 or 900 yards. The EMC allows the single dedicated reticle to provide accurate aimed fire for any of these various caliber bullets by recognizing that all bullets share one or more common EMC legs during their first second's time of flight. These legs are illustrated as one of the reticle's four short cross hairs. As an example, the .257 Roberts/30/378 commonality legs (reticle cross hair) could be a 257 Roberts 200 to 300 yard leg and be illustrated by its #2 cross hair, whereas the 30/378's shared leg would be its 600 to 700 yard leg, the 5th cross hair. The single TRI-FACTOR reticle performs the same tasks for all calibers. The one dedicated reticle interfaces with all rifle calibers. Bullet drop adjustment remains accurate for all cartridges. Wind Bars correct accurately (+/−1.5 mph) for all cartridges to 600 yards.

SYSTEM

I. Description: The described rifle scope/method/reticle works with any high velocity cartridge, measures distance to any size target, confirms the bullet's kill zone; then provides an accurate Aiming Point to 800 yards corrected for drop, wind deflection, Magnus and angle; provides an accurate lead point for running animals to 400 yards.

II. Background: The TDS TRI-FACTOR was invented by an avid big game hunter and combat fighter pilot who instructed seven years at the Jet Fighter Instructor and F-4 Combat Crew Training gunnery schools. He also spent 4 ½ years as a competitive shooter, making the U.S. Olympic Shooting Team and broke what ended up being the oldest world record in international sports. Based upon his studies and his book, Tactical Stress Management, he and his students, have broken 150 national records in competitive shooting. He integrated this and the TDS TRI-FACTOR MENTAL BALLISTICS METHOD to invent the TDS TRI-FACTOR.

A. Advantage: The Reticle is similar in result to the F-16 fighter aircraft's reticle's computing gunsight as it sequentially provides shot adjustment corrected for all pertinent inflight bullet deflections—without taking the shooter's eyes off the target.

B. Benefit: Once acquired, the eyes never leave the target. The shooter corrects the Aiming Point in a manner similar to sliding a transparency over a target. No more Kentucky windage or Arkansas elevation. No more lost opportunities while you crank knobs or use the "Heads Down" display. You make the shot while your system is at it sharpest potential, one second for running game four to five seconds for a 600 yard shot.

III. The Mental Ballistics Program:
   A. Measurement.
      1. The TDS TRI-FACTOR employs Analytic Trigonometry's Cartesian equation (Encyclopedia Britannica, Macropaedia book 28, page 888) using Polar coordinates for the formula:
         a. r is the hypotenuse (the Cartesian Polar coordinate OP, the side of a right triangle opposite the right angle) describing the line or distance from theta to the top of the animal's silhouette.
         b. x-axis is the distance in hundreds of yards from theta, or the shooter, to the base of y (the Cartesian Polar coordinate OM) describes the line or distance from the base of the shooter to the bottom of the target's silhouette. Described as a single figure prefix, 400yards will be identified as 4. Percentages of 100 yards will be attached as a double digit suffix, as in 50% of the distance between 400 and 500 yards will be identified as 450 yards.
         c. Theta (e) is the interpolated angle, constructed while raising line r above line x to subtend, or outline, the target's height for the purpose of measuring distance to said target or animal.
         d. y-axis is the height of the target (the Cartesian Polar coordinate MP) from the x axis line where it intersects the ninety degree angle and is described vertically from that point to the intersection of the r axis line. In hunting, this is the withers-to-brisket silhouette outline, measured in inches, for distance measurement from the hunter to the animal from 300 to 400 yards or the shoulder to hoof measurement, in inches, for measuring distances to 700 yards. Interpolation accuracy is directly proportional to the percentage of target to measuring bar, i.e., a 50/50 relationship is extremely accurate; as the ratio decreases, accuracy is lost.
      2. Distance Measurement Formula:
         a. $y \div \theta = x$, in other words,
            (1) should an elk's chest outline be 24inches deep from withers to brisket and it requires
            (2) six Grid Lines (from a rifle scope reticle delineating "Grid Line" measurements of one inch at 100 yards),
            (3) to outline the elk's chest,
            (4) $24 \div 6 = 4$. The answer is 400 yards (III, A, 1, b, para two).

B. Computing bullet drop. Optimal criteria: bullets with not less than .250Sectional Density (SD) and .350 Ballistic Coefficient (BC) fired in the BC range of 2600 to 3400 feet per second (fps).
      1. Sight in at 200 yards. Using the same 200 yard sight picture, fire a group at 300 yards. Measure the drop in inches. This figure becomes the "Factor" which is used to compute vertical bullet drop, wind drift deflection both horizontally and vertically and gravity correction for both up hill and down hill angle correction.
      2. Bullet drop is progressively curvilinear. However, it is quickly predictable out to .72seconds of free flight (450 yards—.308Winchester, 500—30/06, 600—7 mm. Remington Magnum and 700 yards for a 30/378 with ** high energy maneuverability bullets).
   C. The formula. Triple the Factor for the 400 yard bullet drop, double the 400 yard drop for 500 yards and double the 500 yard figure—less ten—for the 600 yard drop. For instance, a Six Factor bullet (100 grain 7 mm. Remington Magnum fired at 3,200 fps) will compute thusly:
      1. 300 yard drop: The Factor—6
      2. 400 yard drop: 3×6=18 "
      3. 500 yard drop: 18×2=36 "
      4. 600 yard drop: 36×2=72−10=62 "
   D. Computing the bullet deflection due to wind drift.
      1. The applicable Factor becomes the 10 mph wind correction, applied in a linear manner.
         a. 300 yard drift=6"
         b. 400 yard drift is 6+6=12"
         C. 500 yard drift is 12+6=18"
         d. 600 yard drift is 18+6=24"
         e. A 5 mph wind would be half the value, a 20mph wind would be twice the value.
   E. Computing Magnus (Yaw Repose) crosswind values.
      1. Magnus makes the bullet rise with a right-to-left crosswind, drop with a left crosswind.
      2. Take ¼th the horizontal value and add it vertically to the final aiming point using the reticle wind bar as a transparency overlay.
   F. Computing uphill downhill gravity values.
      1. Angle shots require less hold over due to less gravity pull. Bullet drag remains the same. The formula for a 60 degree angle shot:
         a. 200 yards; reduce holdover ⅔rds the Factor, 4".
         b. 300 yards; double the previous value, 8".
         C. 400 yards, double the previous value, 16".
         d. 500 yards; double the previous value, 32".

IV. Constructing the Reticle

One of the most popular hunting rifles is the .300 Weatherby magnum, shooting a 180 grain Hornady Spire Point bullet. Constructing a reticle for this bullet in accordance with the TDS TRI-FACTOR MENTAL BALLISTICS System, A. Measurement Grid Lines
      1. These would be set at 2, 5, 7.5 and 10.5 as reference lines for measurement in accordance with the TRI-FACTOR formulas.
   B. Drop Compensation Bars or Crosshairs
      1. These would position, in accordance with the TRI-FACTOR formulas, a Six Factor bullet at the #2 Grid Line or 6 inches low at 300 yards (6 inch drop at 300 yards), at the #4.5 Grid Line or 18inches low at 400(3×6=18), at the 7.2 Grid Line or 36 inches low at 500 yards (18×2=36) and at 600 yards at the 10.33

Grid Line or 62inches low (36×2−10). These numbers were found to be accurate for the bullet but extremely counter intuitive for a rifleman under stress to divide for distance measurement. Therefore, the Grid Lines were changed to 4.8, 7.5 and 10.5. They are alluded to as 2, 5, 7.5 and 10.5 for easier recollection. This slight change has no effect on the actual measurement or bullet drop compensation but is essential to keep the shooter in a proper Brain Model for accurate and repeatable shooting, for the shooter to make a fast and accurate shot. Extensive tests have proven that the system is within 3% accuracy of a laser device.

2. The Wind Bars
   a. These would position, in accordance with the TRI-FACTOR formulas,
      (1) Crosshair #2 Wind Bar=2 Inch Angles
      (2) Crosshair #3 Wind Bar=3 Inch Angles
      (3) Crosshair #4 Wind Bar=3.6 Inch Angles
      (4) Crosshair #5 Wind Bar=4 Inch Angles
   b. However, to accommodate all six of the Factor rifles and remain accurate to + or −1.5 mph, the Wind Bars were changed to
      (1) Crosshair #2 Wind Bar=2.06 Inch Angles
      (2) Crosshair #3 Wind Bar=2.95 Inch Angles
      (3) Crosshair #4 Wind Bar=4.16 Inch Angles
      (4) Crosshair #5 Wind Bar=4.86 Inch Angles

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a side view of an embodiment of a telescopic isight of the present invention mounted upon a rifle of the type commonly used for hunting and target shooting.

FIG. 2 is a schematic illustration of the internal components of a variable power telescopic sight of the type shown in FIG. 1.

FIG. 3 is an enlarged view showing an aiming reticle component of the sight of FIG. 1 as it appears to the user of the sight.

DESCRIPTION OF THE PREFERRED EMBODIMENT

Figure 4A:
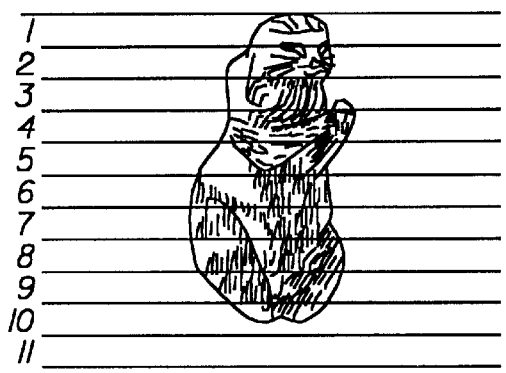
FIGS. 4A, 4B and 4C illustrate the use of calibration grids for learning the use of the scope of this invention.

Referring to FIGS. 1–3, an embodiment of the telescopic sight 10 of this invention is shown attached by a suitable mount 35 to rifle 12. The sight 10 is comprised of tubular housing 11 containing forwardly positioned objective lens element 13, rearwardly positioned ocular or eyepiece lens element 14, intervening erector lens element 15, and reticle 16 disposed between said objective lens element 13 and erector lens element 15. In the case of vari-focal or zoom scopes, a positionally adjustable magnifying lens 17 is associated with erector lens element 15. The exterior of housing 11 may be equipped with rotatively moveable features 36 for adjusting focus, magnification ratio, windage and elevation. Said lens "elements"may be single lenses or combination of lenses.

Reticle 16 is a circular flat transparent panel mounted within housing 11 in perpendicular relationship to the optical axis or line of sight 18 of the scope, and positioned between objective lens element 13 and erector lens element 15 at a site considered to be a front focal plane of the optical system within the housing. Reticle 16 contains fine line (hairline) indicia comprising center vertical and center horizontal hairlines 19 and 20, respectively, which orthogonally intersect at center point 26, and first, second, third and fourth horizontal range-marker lines 21, 22, 23 and 24 of sequentially incremental length disposed below center point 26 in vertically bisected relationship with said center vertical hairline. Center point 26 represents the sighted-in bullet impact point at 100 and 200 yards. The sites of intersection of said first, second, third and fourth range marker lines with said vertical hairline, designated first, second, third and fourth alternative aiming points 30, 31, 32 and 33, respectively, represent sighted-in bullet impact points at 300, 400, 500 and 600 yards, respectively for a six factor rifle. The radially distal portions of said center vertical and center horizontal hairlines are widened to form heavy posts 25 whose radially directed innermost extremities 28 are disposed upon a circular locus about center point 26.

The various dimensions and spaced relationships of the indicia on the reticle are critic al features of the present invention. Said dimensions are best expressed as inches of subtention at 100 yards. Accordingly, the width of heavy posts 25 is 5.5 inches, and the width of the remaining thin portions of said center vertical and center horizontal hairlines 19 and 20, respectively, is 0.6 inches. The distance between center point 26 and the innermost extremities 28 of said heavy posts is 25inches.

The distances of separation of said first, second, third and fourth range marker lines from center point 26 are 2.0, 4.8, 7.5and 10.5 inches, respectively. Said four range marker lines are of equal 0.3 inch width and are preferably straight and orthogonally bisected by the lower half of center vertical hairline 19. The lengths of said first, second, third and fourth range marker lines are 4.12, 5.90, 8.32 and 9.72 inches, respectively.

Figure 4B:
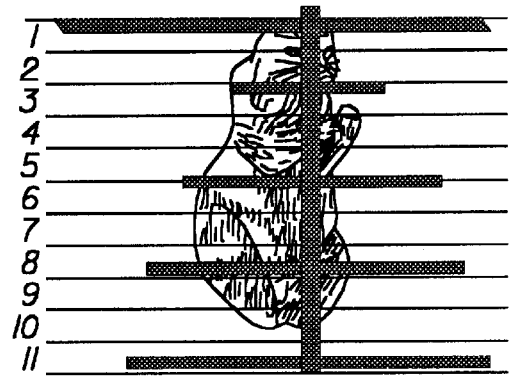
Figure 4C:
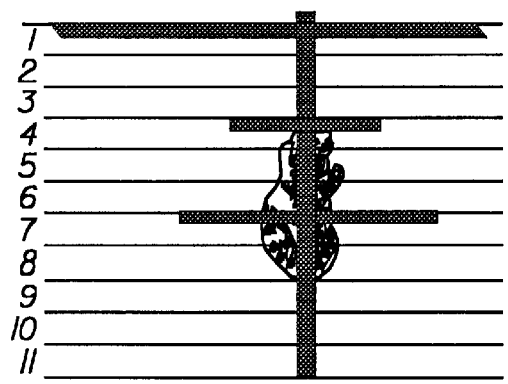

The use of the scope of this invention in measuring target distance may best be visualized by employing grid line charts as shown in FIGS. 4A, 4B and 4C. Each grid line chart consists of a series of numbered horizontal straight lines sequentially spaced an inch apart and visibly distinct in the scope at the indicated ranges. A target such as a prairie dog of 9 inch height is drawn to occupy the top nine lines of a chart, as shown in FIG. 4A, and placed at a range 100 yards. The scope is then sighted onto said 100 yard target, producing the view shown in FIG. 4B wherein the top of the prairie dog is placed at center point 26, and the bottom of the prairie dog falls between the third and fourth range marker lines, namely between 7.5 and 10.5 inches from center point 26. By interpolation, the bottom of the target is 9 inches from counterpoint 26. It is accordingly ascertained that the prairie dog target is located at a 100 yard shooting range.

It should be noted that the target heights subtended by the horizontal range marker lines increase in direct arithmetic proportion to the distance of the target. Therefore, at 200yards, said first, second, third and fourth range marker lines measure targets of 4, 10, 15 and 21 inch heights, respectively. When the same 9 inch prairie dog target is viewed for example at 300 yards, the view through the scope is as shown in FIG. 4C, wherein the target appears much smaller because the range marker lines now correspond to progressive heights of 6, 15, 22.5 and 31.5 inches in descending order down said center vertical hairline. Now the bottom of the target will be located between the first and second range marker lines, corresponding to 3inches at 100 yards. In order to determine the distance of the target, the height of the target is divided by the inch reading on the reticle corresponding to the line reading on the grid line chart. In this example, the 9 inch target would measure 3 inches on the reticle, accordingly, the target range is 9÷3= 3×100 or 300 yards.

Once the target range has been determined, the scope can be accurately aimed by centering upon the desired location of bullet impact the appropriate aiming point or approximation thereto along the vertical hairline.

Figure 5:
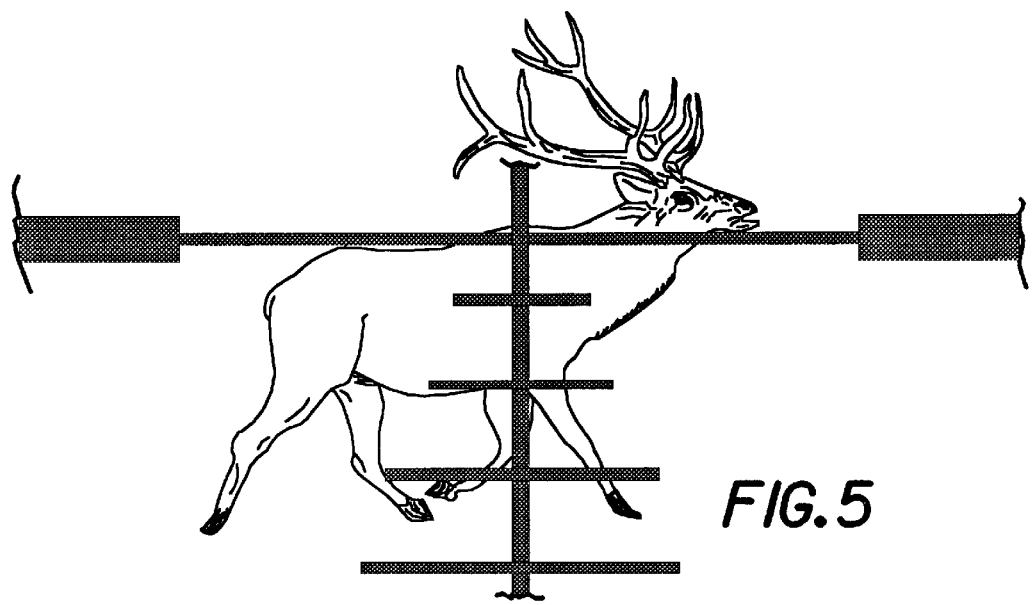
FIG. 5 illustrates the use of the scope of this invention on large targets.

FIG. 5 illustrates the reticle view with respect to a Rocky Mountain Elk having an estimated 25 inch chest height. It is seen that the 25 inch chest is spanned by about 5 inches worth of reticle distance. Accordingly, the range is 25÷5= 5×100 or 500 yards, and aiming point 33 is employed for shooting, centered upon the target.

Figure 6A:
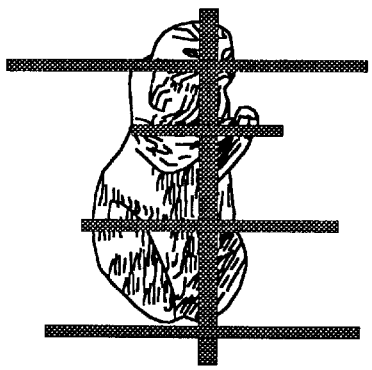
FIGS. 6A and 6B illustrate the use of the scope of this invention on a small target.
Figure 6B:
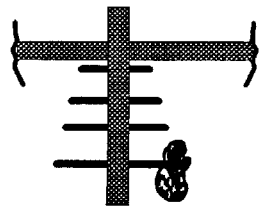

FIG. 6A illustrates the sight picture for shooting at a 9inch high prairie dog at 100 yards. FIG. 6B illustrates the sight picture for shooting at a 9 inch high prairie dog at 600yards with a 10 m.p.h. left cross wind.

Figures 7, 8, 9:
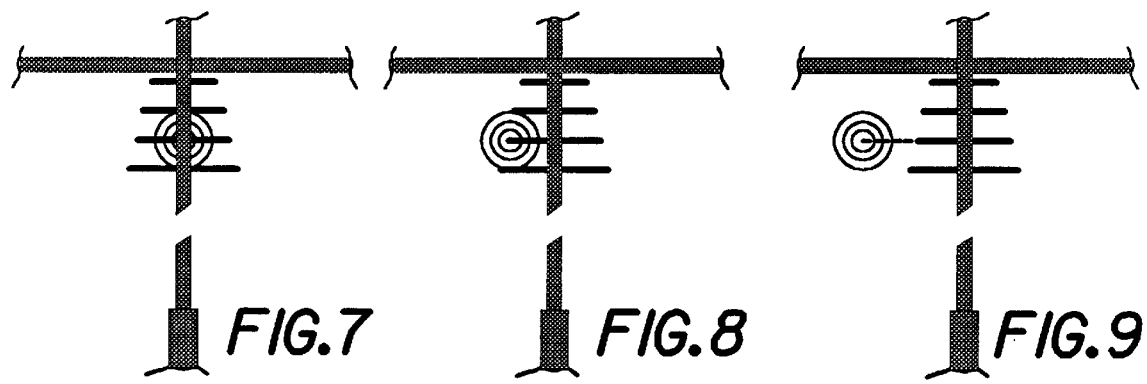
FIGS. 7–11 exemplify sighting images perceived by the shooter in various shooting situations.

FIG. 7 illustrates the view through the scope when shooting at a target at 500 yards.

FIGS. 8 and 9 illustrate adjusted aiming points to compensate for 10 m.p.h. and 20 m.p.h. right-to-left cross winds, respectively.

Figures 10, 11:
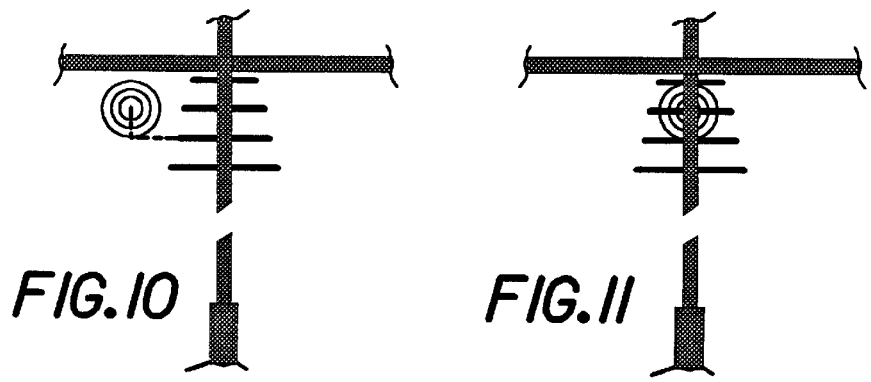
Figure 12:
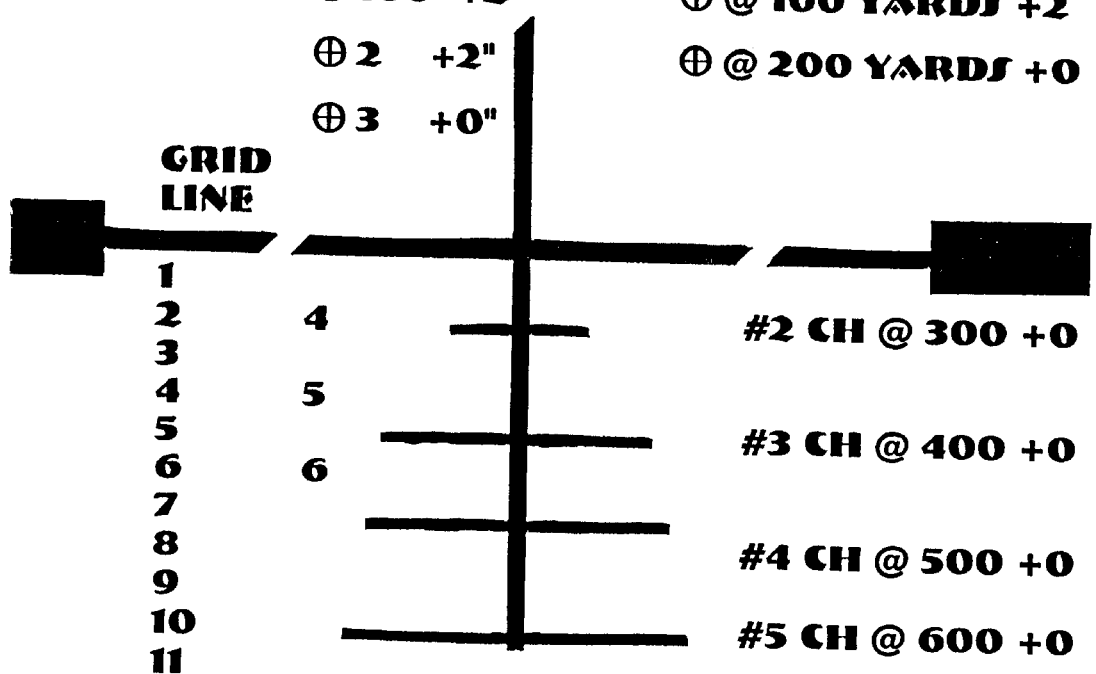
FIG. 12 illustrates the reticle depicted in the form of a decal for taping upon the objective extremity of the scope. The left hand Grid Line column serves as a reminder to denote the actual number of lines with which to divide into the animal's or target's outline for measurement. The right column, Aiming Point at level angle, denotes the bullet impact point for a 6 Factor rifle: Sight in at 100 yards=a bullet impact of 1.84 inches, a perfect zero at 200 yards, then the 300 through 600 yards crosshairs will provide a precise impact point at each respective distance. The center column, Aiming Point Grid Line at 45 degree angle, denotes the angle correction. Angle shots are calibrated precisely for all Factor rifles, but the 6 Factor is the universal mountain rifle. For a Six Factor rifle, simply move up one crosshair for a 45% angle shot. See Barnes Ballistics, .300 WBY 180 HORN SP, Chart one, Sea Level and Chart two, 6,500', for the computer configuration analysis of the TRI-FACTOR Mental Ballistics computation of said reticle. There are six Factor rifles. The TDS TRI-FACTOR reticle performs with each with the same precise degree of accuracy. The customer is provided a similar but idiosyncratic reticle decal for each.

FIG. 10 illustrates the adjusted aiming point for a 20m.p.h. right-to-left vertical component of wind deflection. The rifleman's idiom designates this as a Magnus effect, but is actually Yaw of Repose, the vertical element of a gyroscopically spinning missile. The formula for evaluating the potential worst case effect of Magnus is to adjust ¼th the total value by sliding that point onto the target. In the example of FIG. 10 we see the aiming point as an interpolated point left one equal wind bar (10 m.p.h.) and ¼ above the left tip of said third range marker line. A low-drag high-speed bullet may react to Magnus only a small percentage of the adjustment in FIG. 10. However, hunting bullets do not fall into this category. The rule is to construct a "kill zone" on the target and then hold "worst and best" Magnus movement so that the bullet is accurately aimed.

FIG. 11 illustrates a sight picture and aiming point for six factor rifle at a 45 degree up hill shot at 500 yards slant range. The appropriate sighting adjustment in such situation is to move up one range marker line for a 45 degree angle, twice that for a 60 degree angle, and one half for a 30 degree angle.

It is to be noted that specialized reticles may be needed for each particular rifle/cartridge combination and scope magnification. It is further to be noted that the shooter need not divert his attention from the image in the scope for determining distance and other corrections and finding the proper aiming point. Accordingly, the telescopic gunsight of this invention is particularly well suited to shooting moving targets.

It is to be noted that the final sight picture, corrected for external ballistics, results in a straight line aim at the target in the same manner as a point blank range would result. This enables the shooter to have much more confidence in the result.

Definitions and explanation of certain terms employed herein are contained in the ADDENDUM forming a part of this specification.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. In a telescopic gunsight having an optical system comprised of a forward objective lens element, a rear eyepiece lens element and intervening erector lens element, said elements being aligned upon an optical axis constituting a line of sight and protectively confined within an elongated tubular housing adapted to be securely affixed to a rifle, the improvement comprising the addition into said optical system between said objective and erector lens elements of a transparent reticle having distance-measuring and aiming indicia, said indicia comprising orthogonally intersecting center vertical and center horizontal straight hairlines, said center vertical and center horizontal hairlines having radially distal portions which are widened so as to form posts having radially directed innermost and outermost extremities, and four straight horizontal range-marker hairlines of sequentially incremental length disposed below said center horizontal hairline in vertically bisected relationship with said center vertical hairline.

2. The telescopic gunsight of claim 1 wherein the intersection of said center vertical and center horizontal hairlines constitutes a center point which defines a bullet impact point at 100 and 200 yards.

3. The telescopic gunsight of claim 2 wherein the sites of intersection of said first, second, third and fourth range-marker hairlines with said vertical hairline constitute first, second, third and fourth alternative bullet impact points, respectively, at ranges of 300, 400, 500 and 600 yards, respectively.

4. The telescopic gunsight of claim 1 wherein the innermost extremities of said posts are disposed upon a circular locus about said center point.

5. The telescopic gunsight of claim 1 wherein the dimension of the various features of said reticle correspond to inches of subtention at 100 yards.

6. The telescopic gunsight of claim 5 wherein the width of the unwidened portions of said center vertical and center horizontal hairlines is 0.6 inches.

7. The telescopic gunsight of claim 5 wherein the distance between said center point and the innermost extremities of said posts is 25 inches.

8. The telescopic gunsight of claim 5 wherein the distances of separation of said range marker lines from said center point are such as to cause the sequential spacing between said range marker lines to progressively increase.

9. The telescopic gunsight of claim 5 wherein the distances of separation of said first, second, third and fourth range marker lines from said center point are 2.0, 4.8, 7.5 and 10.5 inches, respectively.

10. The telescopic gunsight of claim 5 wherein the lengths of said first, second, third and fourth range marker lines are 4.12, 5.90, 8.32 and 9.72 inches, respectively.

* * * * *